(12) United States Patent
Hogan

(10) Patent No.: US 6,652,270 B1
(45) Date of Patent: Nov. 25, 2003

(54) CONSTANT VOLUME PROCESS FOR MANAGED HEAT CURE OF IMPREGNATION SEALANTS

(75) Inventor: Michael B. Hogan, Weatogue, CT (US)

(73) Assignee: Henkel Loctite Corporation, Rocky Hill, CT (US)

(*) Notice: Subject to any disclaimer, the term of this patent is extended or adjusted under 35 U.S.C. 154(b) by 0 days.

(21) Appl. No.: 09/831,370

(22) PCT Filed: Dec. 3, 1999

(86) PCT No.: PCT/US99/28817
§ 371 (c)(1),
(2), (4) Date: May 16, 2001

(87) PCT Pub. No.: WO00/34368
PCT Pub. Date: Jun. 15, 2000

Related U.S. Application Data
(60) Provisional application No. 60/111,128, filed on Dec. 7, 1998.

(51) Int. Cl.[7] .................................................. B28B 17/00
(52) U.S. Cl. ..................... 432/12; 432/18; 264/40.5; 264/40.6; 425/144; 425/149
(58) Field of Search ............................... 432/12, 18, 4; 427/385.5, 386, 387, 246, 243–247; 264/347, 325, 319, 40.5, 40.6; 425/144, 149, 117

(56) References Cited

U.S. PATENT DOCUMENTS

| | | | |
|---|---|---|---|
| 3,672,942 A | 6/1972 | Neumann et al. ........... 117/62.2 |
| 4,119,746 A | 10/1978 | Bleyle ......................... 427/381 |
| 4,296,065 A | * 10/1981 | Ishii et al. ................... 264/325 |
| 4,416,921 A | 11/1983 | Dunn .......................... 427/353 |
| 4,515,848 A | * 5/1985 | Leunig et al. ............... 428/172 |
| 5,273,662 A | 12/1993 | Muisener et al. ........... 210/734 |
| 5,474,606 A | * 12/1995 | Twardowska et al. ...... 106/632 |
| 6,017,588 A | 1/2000 | Watanabe et al. ......... 427/407.1 |

* cited by examiner

Primary Examiner—Gregory A. Wilson
(74) Attorney, Agent, or Firm—Steven C. Bauman

(57) ABSTRACT

An improved method is disclosed for heat curing a polymerizable impregnant composition within an impregnated porous article. The amount of the article's porosity that is filled with the impregnant composition is maximized by applying successively discrete temperature and pressure increments in a system comprising at least one porous impregnated article and a curing chamber having a heat transfer medium therein. During such curing, both temperature and pressure are controlled for an initial duration and subsequently increased by successive increments wherein each successive temperature and pressure exceeds a previous temperature and pressure, respectively, until a maximum temperature and pressure is achieved. The maximum temperature and pressure are maintained until the impregnant composition is cured, resulting in an improved product having greater structural integrity and surface quality.

53 Claims, 5 Drawing Sheets

MANAGED HEAT CURE OF IMPREGNATION SEALANTS IN CONVENTIONAL IMPREGNATION PROCESS

DRY VACUUM/PRESSURE
IMPREGNATION PROCESS

CONSTANT VOLUME PROCESS FOR MANAGED HEAT CURE OF IMPREGNATION SEALANTS

This application claims the benefit of Provisional application Ser. No. 60/111,128, filed Dec. 7, 1998.

FIELD OF THE INVENTION

This invention relates to a process for impregnating porous articles with a curable impregnant composition. More particularly, this invention relates to a process for heat curing impregnated porous articles which includes making successive incremental temperature and pressure increases, each of which are sustained during the curing process. The invention includes a heat curing system having a chamber for curing impregnated porous articles and, desirably, a heat transfer medium such as a liquid for immersing the impregnated porous part to be heat cured.

BACKGROUND OF THE INVENTION

It is often desirable to form parts from lightweight metals in order to reduce the weight of a component or system and correspondingly reduce energy consumption as well as the costs of manufacture and maintenance thereof. With the advent of new machining technologies and emphasis on the environmental impact of power usage, more and more lightweight metals are being machined for more and more uses requiring these metals to perform multiple functions simultaneously. Examples of such metals include but are not limited to zinc, copper, brass, iron, aluminum, and various alloys. The terms "porous part" and "porous article" are used synonymously herein to refer to components made from such metals.

An inherent problem with the use of lightweight metals is the presence of micropores which inhibit commercial viability. The occurrence of micropores is especially prevalent in components formed from metal powder. Porosity of porous parts is particularly problematic when such porous parts are utilized in fluid power systems or other liquid applications, where entrance of fluid in micropores can cause premature deterioration and fracture of the part. Other problems include the introduction of air and gas which may create processing or finishing difficulties as well as difficulties in the end use of the porous member.

In response to these problems, impregnation sealing technology emerged as a way to eliminate the micropores inherent in lightweight metal components yet retain the desirable performance characteristics thereof. During an impregnation sealing process, the porosity of porous articles is impregnated with a curable sealant composition, or "impregnant". Upon curing of the impregnant, the resulting sealed part is suitable for use in fluid exposure applications, as well as facilitating plating, coating and further processing of formed articles. The structural integrity of a porous part can also be enhanced through impregnation sealing. Sealing of porous parts maintains many advantages, including: rendering the parts leak-resistant or leak-proof; preventing or minimizing the incidence of internal corrosion in metal castings and sintered parts; increasing density to make the article capable of withstanding liquid or gas pressure during use; improving its strength; and preparing the surface of the article for a subsequent painting or plating operation.

The practice of using a liquid impregnant for the purpose of sealing the porosity of porous articles is a well-known and highly utilized process. Often an impregnation process is followed by an independent curing process. The curing process is conducted independently of the impregnation process to initiate and/or accelerate polymerization of an impregnant composition. Although cure can be accelerated by several factors, such as instantaneous temperature increases and removal of ambient air, the present disclosure is specifically concerned with heat curing processes and problems posed thereby.

A typical impregnation process is shown and described in U.S. Pat. Nos. 3,672,942, 4,416,921 and 5,273,662, all of which are incorporated by reference herein. To execute the conventional steps in the impregnation of a given part, the part is initially degreased and cleaned, then the cleaned part is subjected to vacuum aspiration in a vacuum tank, thereby attempting to remove entrapped air from the minute pores in the part. During immersion of the part in a bath of a curable liquid impregnant, such as an anaerobic or heat curable impregnant, the part is maintained in a vacuum. Subsequently, the immersed part is exposed to atmospheric pressure, thereby causing the liquid impregnant to permeate the minute pores of the part. Any residual liquid impregnant is returned to a storage reservoir and the part which has undergone the impregnation is centrifuged to expel any excess impregnant adhering to the surface thereof. Thereafter, the part is generally cleaned with detergent to remove liquid impregnant remaining on the surface of the part while leaving the impregnant within the pores.

The impregnated part is then conventionally subjected to a curing process, usually at elevated temperatures, to initiate and/or accelerate cure of the impregnant. This curing process is conventionally conducted at a standard temperature for the cure of the chosen impregnant. The impregnated part is placed in a curing chamber wherein curing temperature and pressure levels are pre-set in accordance with selection of part configuration, type of impregnant, end use of the part and other factors. The pre-set temperature and pressure levels are maintained for a time interval sufficient to initiate and achieve a desired level of cure, after which the parts are removed from the curing chamber and often subjected to post-cure treatments such as plating, painting and the like. Impregnation and curing processes are conventionally conducted in separate vessels, however, a common vessel may be employed during an impregnation-curing sequence.

Curing processes can and often are executed after completion of any of several types of impregnation processes. Conventional impregnation processes are accomplished generally by three methods: wet vacuum impregnation, wet vacuum/pressure impregnation or dry vacuum/pressure impregnation. Among these impregnation methods, wet vacuum impregnation techniques are generally employed more frequently than the dry vacuum/pressure method described herein. However, the steps required to complete each of these processes are similarly executed. To effectively illustrate the conventional impregnation processes, examples of such processes are schematically depicted in the flow diagrams of FIGS. 1 and 2. The numbers assigned to FIGS. 1 and 2 are indicative of the different operations or steps performed sequentially on a single containment vessel which is stationary.

During a conventional wet vacuum impregnation procedure (hereinafter "WV process") as shown in FIG. 1, porous parts are placed in a single container or basket at Block 10. The parts and the vessel are then inserted into an impregnation chamber at Block 12 where both parts and basket remain stationary for the duration of the impregnation process. At Block 14, the parts are submerged into a vacuum tank substantially filled with a flowable sealant composition. While the parts are in the vacuum tank, a short term vacuum cycle removes air from the porosity of the parts at Block 16. The duration of the vacuum cycle is dependent upon the material characteristics of the part being treated and the type of sealant used as an impregnant. In this arrangement, the goal is to remove air from the pores of the part to allow impregnant to follow thereinto once the pressure is normalized to ambient pressure. The chamber is then returned to ambient pressure so that sealant penetrates the evacuated porosity of the parts. At Block 18, the parts may then be spun briefly in the basket to eliminate excess sealant from the part surfaces and to prevent undesirable surface curing of the impregnant thereon during the cure cycle.

The conventional wet vacuum/pressure impregnation process (hereinafter "WVP process") has many common steps to the WV process shown in FIG. 1 with the difference being shown at Block 17 where the impregnation chamber is pressurized after the completion of the vacuum cycle at Block 16. Pressurization forces the sealant further into small porosity passages. The centrifuge step at Block 18 may then be carried out to remove and recover excess impregnant from the part surfaces and return the excess to a storage reservoir.

The conventional dry vacuum/pressure impregnation method (hereinafter "DVP process") applies a vacuum to the porous parts before exposing the part to the impregnation sealant. This prior art method is shown in FIG. 2, wherein a basket of porous articles (not shown) is inserted into a containment chamber at Block 20 and placed directly in a dry vacuum chamber at Block 22. Air is evacuated at Block 24 from the porosity in the parts for a duration corresponding to several factors, among which are the type of part being processed and the type of sealant used as an impregnant. At Block 26 a transfer valve is opened from an impregnant storage reservoir which is in fluid communication with the impregnation chamber, allowing sealant to enter thereinto. The chamber is then positively pressurized beyond ambient pressure at Block 28 to force sealant into the parts. After impregnation, while residual sealant is being returned to the storage reservoir, a centrifuge operation carried out at Block 30 spins the porous articles to remove and recover excess impregnant.

Subsequent to impregnation of various porous articles, the articles are often subjected to a separate curing step in which polymerization of the impregnant is accelerated, often by an increase in temperature. A problem with curing of thermally-cured impregnation compositions is "bleed out" in which loss of resin from pores occurs due to expansion of residual air trapped in the heated porosity of the parts being sealed. When residual air is entrapped in the pores of the part, a full cure may be inhibited, leaving portions of the flowable impregnant uncured or only partially cured, and causing residual impregnant to migrate to the exterior surface of a porous part where it cures during the heat cure stage. See U.S. Pat. No. 3,900,940 for an example of how prior attempts have been made to address these drawbacks, albeit unsuccessfully.

When thermal energy is used to cure impregnant compositions in the porosity of the parts to be sealed, the impregnated parts may be heated to effect heat-curing of the composition with polymerization of the monomer component of the impregnant in the case of heat-cure compositions. Alternatively, in the case of anaerobic-cure compositions, the sealant may also be heated after impregnation has been effected to accelerate the anaerobic cure. (Meth)acrylic resins are often preferred due to their superior cure capabilities. However, the high rate of polymerization exhibited by such resins generates an extraordinary amount of heat due to the polymerization.

Impregnation sealants are usually applied in a vacuum/pressure combination process which consistently leaves a small quantity of air trapped in the interior of the part being sealed. Heating that trapped air can have two negative effects. First, the expansion of the gas causes sealant to flow out onto the surface of the part. Second, in parts with non-rigid structure, the gas expansion may actually cause structural failure of the component. In a state of the art process applied to graphite parts, for example, the parts are cured in air at 200° F. The localized temperature in the porous part can reach as high as 400° F. due to the considerable amount of exothermic energy that is released during bulk polymerization. This rapid and extensive expansion of trapped air can change the shape of the part or cause structural failure thereto.

The application of heat during a post-impregnation cure process exacerbates this problem by increasing the pressure of the gas which is trapped within the interior of the pores. As the temperature of the impregnant increases, the trapped gas expands. In weak substrates, expansion of impregnant-dwelling gas therein promotes structural damage thereto and subsequent performance failure thereof.

In addition, cured impregnant surface deposits may cause an impregnated article to vary from desired predetermined dimensional specifications, rendering the part useless for its intended function in applications requiring close dimensional tolerances. Furthermore, these unwanted surface deposits may interfere with subsequent painting, plating or assembly operations which frequently are performed on porous articles subsequent to impregnation. Moreover, removal of these deposits during such painting or plating operations results in contamination of the rinsing baths used in such operations and subsequent interference with adhesion of paint, plating or the like to the impregnated part.

The problems inherent in the above-described process may still occur when a constant temperature and/or pressure is applied. In addition, gas expansion is still likely to occur within the impregnated parts due to the combination of elevated temperature and constant pressure, resulting in internal structural damage to the articles. When the article is heat cured, the residue produces localized surface asperities which may interfere with subsequent operations or cause delamination of applied paint or plated films.

Thus, it is desirable to reduce the amount of bleed out experienced by an impregnant sealant composition and likewise control the application of temperature and pressure in an impregnation process so as to significantly reduce the occurrence of improperly impregnated parts. A need exists for a cure process, associated with an impregnation system, which addresses the aforementioned problems and overcomes them with minimal change to existing systems. The present invention fulfills this need.

SUMMARY OF THE INVENTION

It is an advantage of the present invention to provide a novel heat curing process for curing a polymerizable impregnant composition within a porous article impregnated therewith. The porous article is part of a system which includes a curing chamber which retains a heat transfer medium therein for accelerated curing of the impregnant composition. The heat transfer medium serves as a sink for exotherm during polymerization of the impregnant composition in a porous article. Examples of heat transfer media amenable to practice of the present invention include, without limitation, water, ethylene glycol and essentially any heat transfer medium or bath which is substantially unreactive to both the article and the impregnant composition.

It is a further advantage of the present invention to cure the impregnant composition by subjecting the impregnated article to successively discrete temperature and pressure increases within the curing chamber. Each successive temperature and pressure increment exceeds a previous temperature and pressure increment, respectively, and each successive temperature and pressure is sustained at a time interval sufficient to substantially normalize the temperature of the system. Escalation of temperature and pressure in this manner promotes cure of the impregnant composition until a predetermined desired temperature and pressure is obtained. The final desired temperature and pressure are maintained for a time sufficient to cure the impregnant composition to a desired extent. Although it is preferable to obtain full cure of the impregnant, a partial cure may be desirable in some instances, for example, when post-curing treatments are to be performed to prepare the article for its eventual application.

Selection of the temperature and pressure increments, as well as the appropriate time intervals, depends upon a multitude of factors. Such factors are chosen from selection criteria including type and amount of impregnant composition, configuration and size of said porous article, type of material used to fabricate said porous article, process of manufacturing said article, end-use of said porous article and combinations thereof. These criteria are provided for example only and do not limit the factors to be considered when determining adequate temperature and pressure increments in relation to time.

Thus, one embodiment of the present invention relates to a managed heat cure process for effecting improvement in the production of impregnated porous articles. As used herein, the term "managed heat cure process" denotes a novel post-impregnation heat curing process in which temperature and pressure is controllably increased and maintained in successively discrete levels while an impregnated porous article is submerged in a heat transfer medium in a curing chamber. In the present invention process, the temperature of any residual air inside of an impregnated article substantially equals that of the part itself. Thus, when a thermocouple is coupled to the article to measure the temperature thereof, it is assumed that the air within the part's pores is also at the measured temperature.

Incremental temperature and pressure increases are controllably applied in relation to corresponding time intervals, wherein the duration of each interval is sufficient to promote cure of the impregnant composition. A cure process which utilizes such controlled increases in temperature and pressure significantly differs from prior art methods in which temperature and pressure are instantaneously set at predefined levels. In the present invention, as the air heats up and expands, pressure is accordingly increased in a stepwise fashion. The increasing pressure opposes the expanding volume of the heated residual air, resulting in fewer surface asperities and improving overall structural integrity of impregnated parts.

An additional embodiment of the present invention relates to a system for heat curing a polymerizable impregnant composition within a porous article impregnated therewith. The system includes a curing chamber having a heat transfer medium therein in which the porous article is placed. The system further includes means for controlling pressure and temperature in discrete successive increments wherein each successive temperature and pressure increment exceeds a previous temperature and pressure increment, respectively. During these successive incremental increases, each successive temperature and pressure is sustained at a time interval sufficient to substantially normalize the temperature of the system and also to promote cure of the impregnant composition until a desired maximum temperature and pressure is obtained. Means for verifying the discrete temperature and pressure increments may also be provided which enables maintenance of the maximum temperature and pressure to cure the impregnant composition. Like the aforedescribed method, the discrete temperature and pressure increments are specifically selected to minimize structural damage of said porous article.

A further embodiment of the present invention provides a porous article having porosity filled with a polymerizable impregnant composition and improved structural integrity and surface quality. This product is formed using the method and system described hereinabove.

An additional embodiment of the present invention provides a method of producing an improved impregnated porous article comprising the steps of: impregnating a porous article with a polymerizable impregnant composition; placing the impregnated article in a curing chamber having a heat transfer medium therein; heat curing said impregnant composition by subjecting said impregnated article to successively discrete temperature and pressure increases within said curing chamber wherein each successive temperature and pressure increment exceeds a previous temperature and pressure increment, respectively, and each successive temperature and pressure is sustained at a time interval sufficient to substantially normalize the temperature of said system and promote cure of said impregnant composition until a desired maximum temperature and pressure are obtained thereby. Maintaining said maximum temperature and pressure can be used to partially or fully cure said impregnant composition. The discrete temperature and pressure increments are desirably selected to minimize structural damage of said porous article. Determination of the temperature and pressure levels sufficient to cure the impregnant composition is made according to various criteria, such as those described hereinabove. Incorporation of characteristics that are endemic to the system enables optimization of the associated curing process to further alleviate the occurrence of structural damage to the parts during such cure process.

DETAILED DESCRIPTION OF THE PREFERRED EMBODIMENTS

Figure 5:
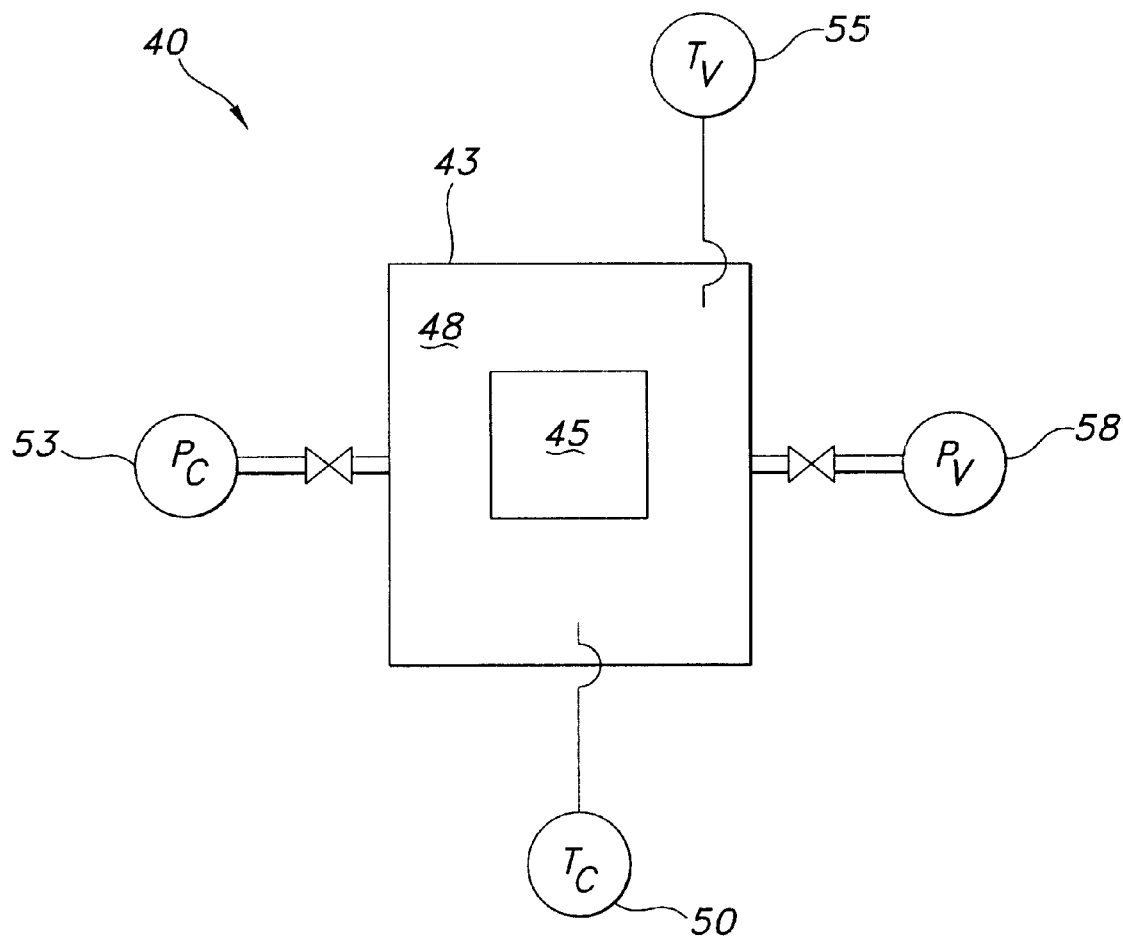
FIG. 5 shows a schematic view of the heat cure system of the present invention.

In the present invention, impregnated porous articles are subjected to a curing process in which hardening of an impregnant composition within the articles is initiated and/or accelerated by the application of heat. In order to alleviate the negative effects of elevated heat transfer due to the polymerization of the impregnant upon the porous articles, a heat cure system 40 illustrated in FIG. 5 is described which includes a curing chamber 43 having the impregnated articles 45 and a heat transfer medium 48 therein. Porous impregnated articles 45 are subjected to a series of successively discrete incremental temperature increases where each temperature and pressure increment is sustained for a specific time interval prior to addition of a subsequent temperature and pressure increment until a desired temperature and pressure are obtained thereby. Each time interval is sufficient to promote cure of the impregnant composition, and the final time interval at which the maximum temperature and pressure are sustained is sufficient to achieve the amount of cure desired. Application of such incremental temperature and pressure increases in association with a heat transfer medium 48 ensures that expansion of impregnant-dwelling gasses is counteracted so as to prevent structural damage to the impregnated part. Throughout this disclosure, the terms "impregnant", "impregnant composition" and "sealant" will be used interchangeably.

Figure 1:
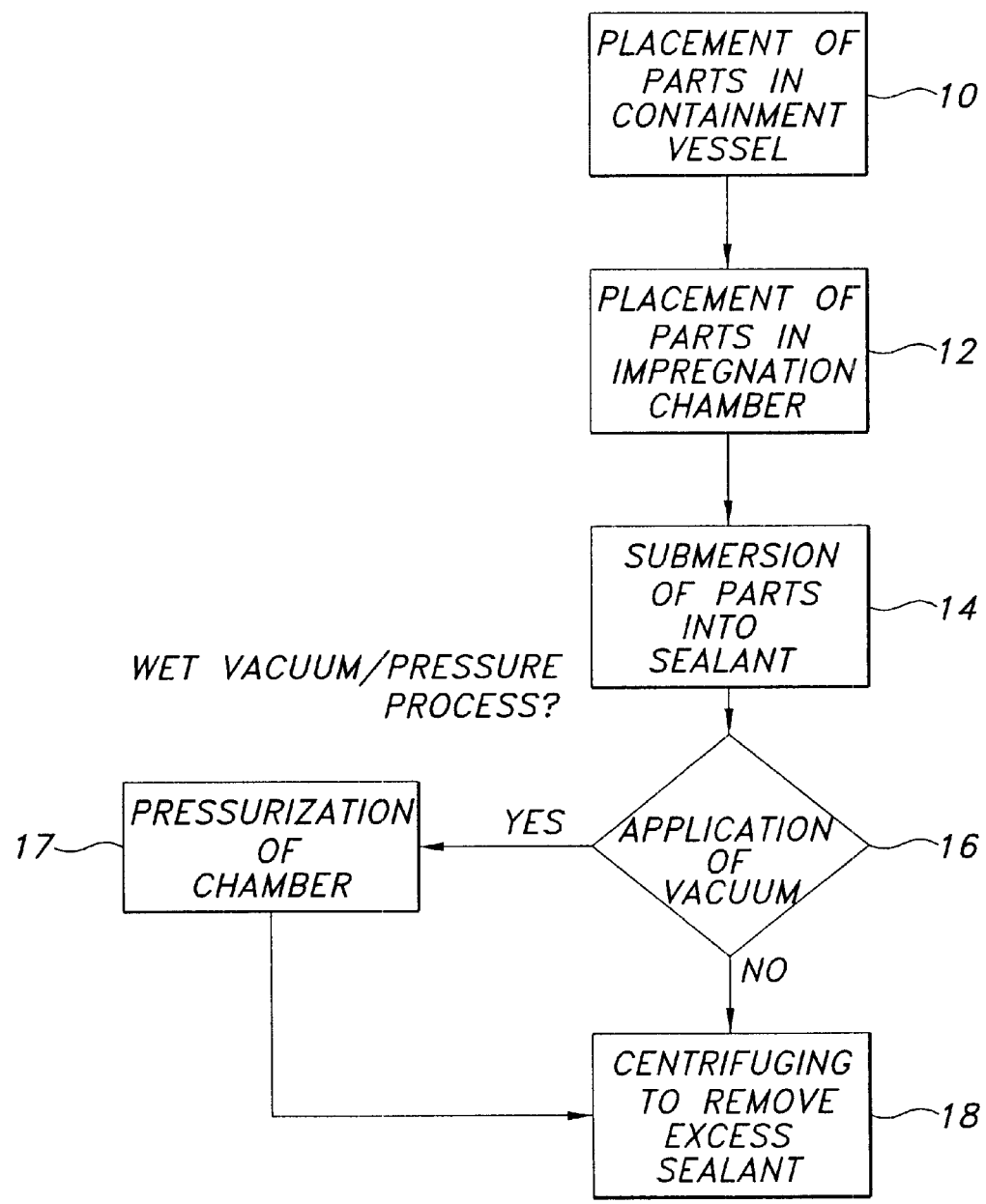
FIG. 1 shows a flow chart of a wet vacuum impregnation process and a wet vacuum/pressure impregnation process of the prior art.
Figure 2:
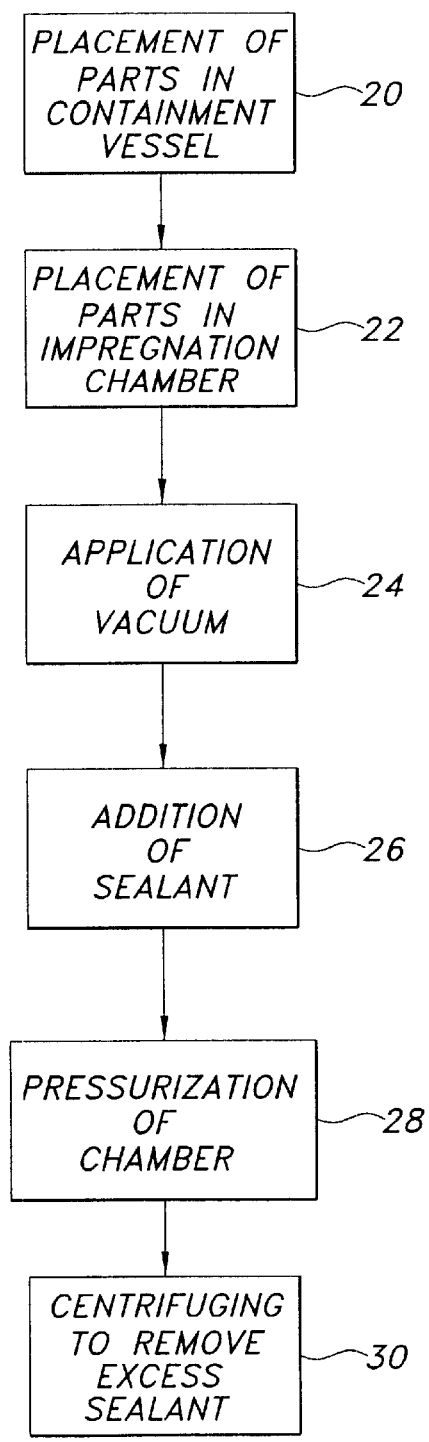
FIG. 2 shows a flow chart of a dry vacuum/pressure impregnation process of the prior art.
Figure 3:
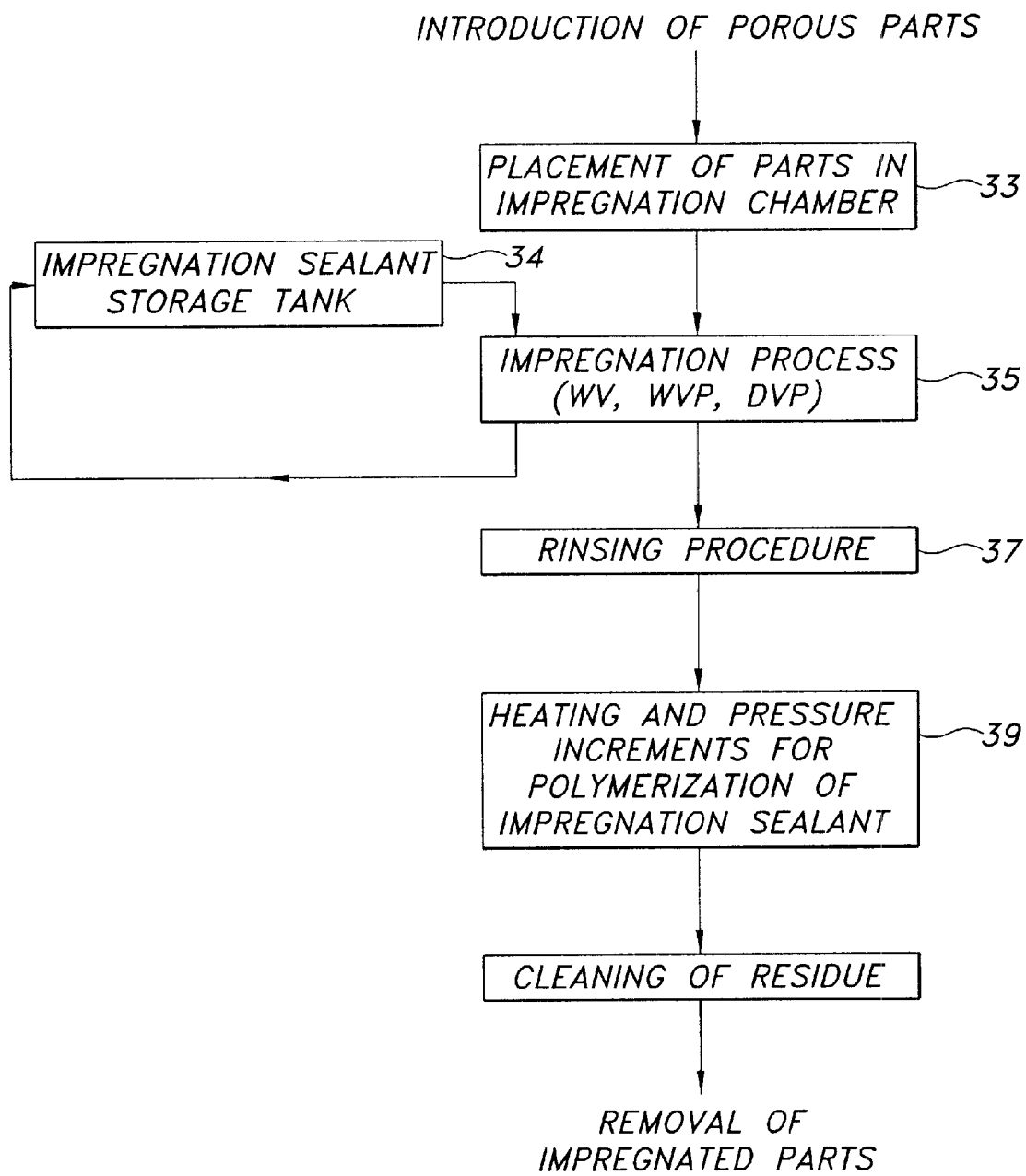
FIG. 3 shows a flow chart of a managed heat cure process of the present invention as practiced in conjunction with an impregnation process of the prior art.

The novel process of the present invention is illustrated in FIG. 3 with respect to a conventional impregnation process of the prior art. At least one porous article is placed into an impregnation chamber at Block 33 and subjected to a conventional impregnation process at Block 35. The impregnation process may be any one of a WV, WVP or DVP process as shown in the prior art (see FIGS. 1 and 2). During an impregnation cycle, polymerizable impregnant composition is retained within a storage vessel as shown at Block 34. The impregnant composition is drawn from the storage vessel to impregnate the porous article and any residual composition is returned thereto after impregnation is completed. Subsequent to completion of the impregnation process, the article is typically rinsed to remove excess impregnant from the exterior surface thereof as illustrated at Block 37.

At Block 39, the managed heat cure method of the present invention is performed to effect polymerization of the impregnant composition within the porosity of the impregnated part. A heat cure system is provided which includes a heat curing chamber within which a heat transfer medium is maintained at a specific temperature. This temperature is dependent upon a multitude of factors which includes, but is not limited to, the type of medium used, desirability for a full or partial cure, type of sealant used, configuration of the porous article or a combination of these factors. The heat transfer medium serves as a sink for exotherm during polymerization of the impregnant composition. Examples of heat transfer media which can be employed include, without limitation, water, ethylene glycol and essentially any heat transfer medium or bath which is substantially unreactive to both the article and the impregnant composition.

During the cure cycle executed at Block 39, escalating successive increments of temperature and pressure are applied to the cure chamber while the impregnated article is maintained in the heat transfer medium. The impregnated article is subjected to a first temperature and pressure for a first time interval sufficient to initiate cure of the impregnant composition. The impregnated article is subsequently subjected to a second temperature and pressure in excess of the first temperature and pressure, respectively. The second temperature and pressure are maintained for a time interval sufficient to promote cure of the impregnant composition from cure initiation to cure completion. The impregnated article may be further subjected to successively discrete, incremental temperature and pressure increases within the cure chamber. Each successive temperature and pressure increment produces a temperature and pressure in excess of the previous temperature and pressure. Each successive temperature and pressure is maintained for a time interval sufficient to substantially normalize the temperature of the system and further promote cure of the impregnant composition. Incremental increases are continued until a predetermined desired temperature and pressure is achieved. The maximum temperature and pressure are simultaneously maintained for a time sufficient to cause the desired cure of the impregnant composition.

The discrete temperature and pressure increments are precisely selected in accordance with the characteristics of the systems, taking into account such factors as type of sealant used, configuration and material composition of the article, end use of the article and combinations thereof. However, other factors may be taken into consideration to further optimize the procedure experimentally to achieve optimum structural integrity of the impregnated articles.

As previously stated, the temperature of any residual air inside of the impregnated article substantially equals that of the part itself. As the article is heated, the pressure in the tank is increased as a function of article temperature rather than instantaneously applied as in conventional methods. Temperature is increased in the curing process as a function of time, during which time temperature within the impregnated part likewise increases. Means for controlling the escalating temperature 50 can include a convection oven having either analog or electronic temperature control.

Figure 4:
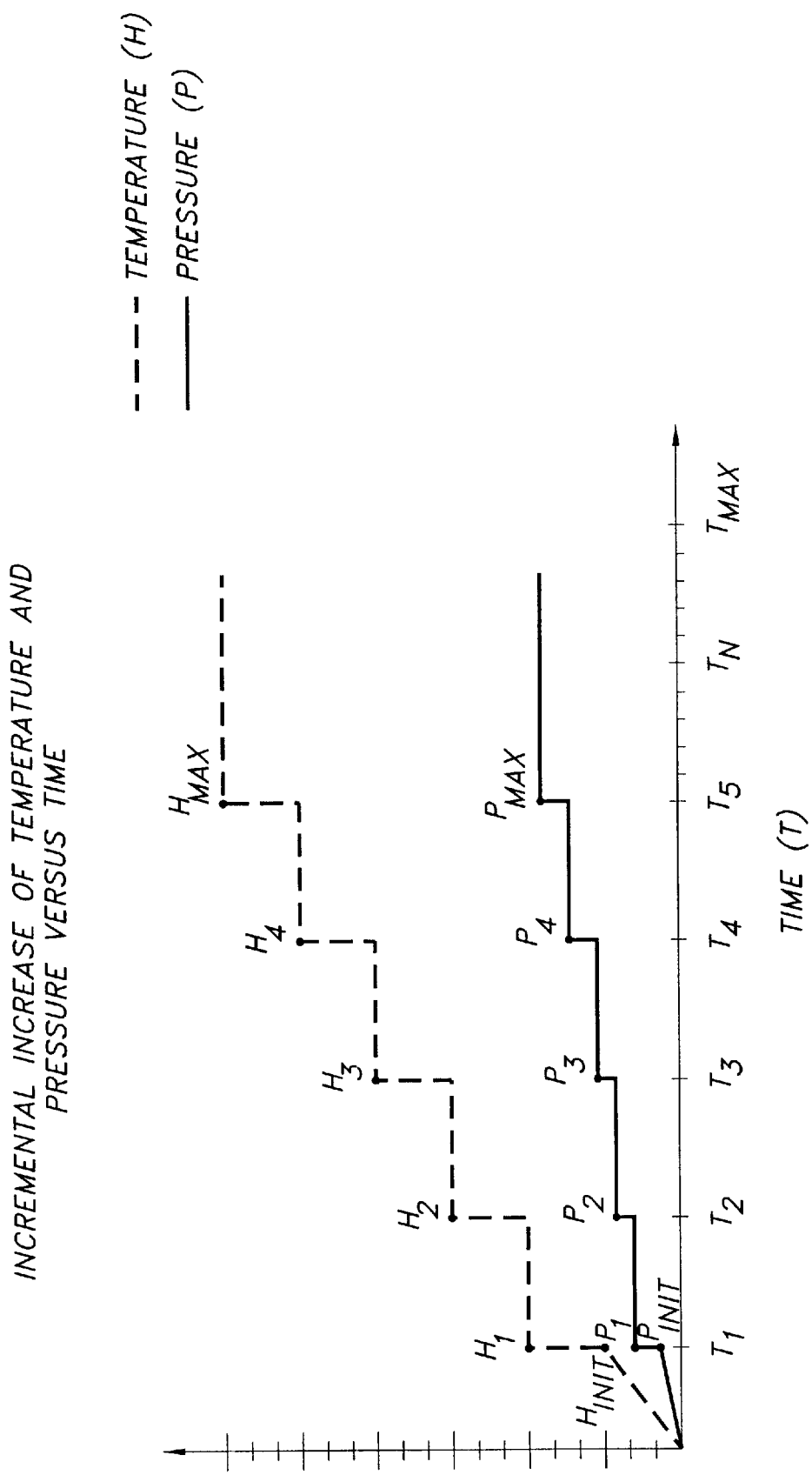
FIG. 4 shows a graph of incremental increases of temperature and pressure in relation to time as implemented in the present invention managed heat cure process.

Application of increasing pressure during the cure cycle is simultaneously controlled by a pressure control means 53 in relation to the increments of temperature increases. The increasing pressure acts to oppose the expanding volume of any heated residual air. A graphical representation of this relationship is provided in FIG. 4, wherein incremental increases in temperature and pressure are illustrated with respect to the duration of an illustrative curing process. Measurement and verification of temperature and pressure at the initiation and completion of each time increment can be effected by using temperature and present increment verifying means 55, 58 such as a calibrated thermometer and pressure gauge, respectively. The temperature and pressure increments are added at discrete points in time to normalize the system at or near a desired temperature and pressure. This representation is an example and in no way limits the frequency and level of the increments that are applied within a given time interval during the cure cycle.

It is important to conduct the disclosed curing process in a heat transfer medium to absorb excess heat borne by the system as temperature is controllably increased therein. It is also important to correlate escalation in pressure with a corresponding escalation in temperature. As temperature of the impregnated article increases, pressure should be increased accordingly, enabling control of gas expansion within the impregnant as it cures. Such control is desirable not only to prevent bleed out, but also reduce the same amount of residual impregnant which must be retrieved or cleaned from the surfaces of impregnated parts and concurrently reduce the amount of waste attributable to such residue. Because there is less likelihood of residual impregnant curing on the parts, there is, in correlation, less likelihood that the residue will cure on equipment, causing damage thereto which requires repairs. Furthermore, less residue on parts results in fewer post-impregnation processes which much be executed to clean the parts due to the accumulation of residue thereon, resulting in time and cost savings which translate into increased production capability.

The aforementioned impregnant sealant may be chosen from any known impregnant composition or sealant. Selection of a specific impregnant composition will depend upon numerous considerations, such as the type of material to be processed, the purpose of the sealant (i.e. fluid deterrence, plating, etc.) and the characteristics of the part itself (i.e. porosity, density, configuration, etc.). The curable composition may include any suitable sealant type such as phenolic resins, vinyl resins, silicone resins, acrylic resins, epoxy resins and the like. However, the present invention is particularly useful with (meth)acrylic resins. (Meth)acrylic resins have been almost exclusively used in porosity impregnation applications due to their highly advantageous viscosity characteristics and rapid curability in anaerobic cure and/or heat-cure formulations. Illustrative commercially available impregnation sealing compositions which may be utilized in the practice of the present invention include Resinol® 90C sealant (a registered trademark of Loctite Corporation, Hartford, Conn.), a heat-cured (meth)acrylic resin; and Resinol® RTC sealant (a registered trademark of Loctite Corporation, Hartford, Conn.), an anaerobic sealant composition curable at ambient temperatures in the substantial absence of oxygen. These resins may be accompanied by other conventionally-used composition components, such as polymerization initiators, catalysts, plasticizers and the like.

The following examples show the results of the inventive managed heat cure process when applied after impregnation of a porous part. The examples are selected to emphasize the benefits derived from controlled pressure applications, namely, the increase of porosity filling of a porous part and the associated reduction in damage to the part during post-impregnation cure procedures.

EXAMPLE 1

Impregnation Process With Conventional Prior Art Cure

Impregnation Process:

A DVP process was used with 10 minutes dry vacuum at 1.5 torr, 2 minutes wet vacuum at 1.5 torr and a 90-minute pressure soak at 90 psi. Both STS-1 (thermal-cure) and STS-2 (anaerobic room temperature cure) sealants were used.

Test Procedure

Sixteen thin graphite plates were cut into half and grouped into eight sets of four plates each. Due to the similarity of the processes, sets using the same sealant were run simultaneously. The sealant used was either a fast gel or slow gel thermal cure sealant (STS-1) or a fast gel or slow gel anaerobic cure sealant (STS-2). A basket of plates was placed into an empty Binks tank and placed under a vacuum level of 1.5 torr for 10 minutes. Once this time had expired, the dry vacuum cycle was completed and transfer of the sealant began.

Once the transfer had finished, the Binks tank was brought to a wet vacuum level of 1.5 torr for 2 minutes. Once the wet vacuum cycle was completed, if the sealant used was STS-1, the Binks tank was depressurized at a constant rate so that it reached atmospheric pressure after 2 minutes. If the sealant used was STS-2, the aeration of the sealant began immediately to prevent sealant from backing up the test equipment. Aeration of STS-2 was required due to the length of time in the pressure soak.

The Binks tank was then placed under a pressure of 90 psi for 90 minutes. Once the pressure cycle was completed, the Binks tank was depressurized at a constant rate so that it reached atmospheric pressure after 5 minutes. Plate samples were then removed from the sealant and hand washed for 15 second per side (a total of 30 seconds per plate), pat dried with paper towels and allowed to air dry for approximately 10 minutes. The curing steps were the followed according to the following matrix.

| Run | A Resin | B Gel Time | C Max Temp. | AB Pressure (atm) | AC Temp. ramp | BC | ABC |
|---|---|---|---|---|---|---|---|
| 1 | STS-1 | Long | 135° C. | 4 atm | 4°/min | N/A | N/A |
| 2 | STS-1 | Long | 100° C. | 4 atm | 1°/min | N/A | N/A |
| 3 | STS-1 | Short | 135° C. | 1 atm | 4°/min | N/A | N/A |
| 4 | STS-1 | Short | 100° C. | 1 atm | 1°/min | N/A | N/A |
| 5 | STS-2 | Long | 135° C. | 1 atm | 1°/min | N/A | N/A |
| 6 | STS-2 | Long | 100° C. | 1 atm | 4°/min | N/A | N/A |
| 7 | STS-2 | Short | 135° C. | 4 atm | 1°/min | N/A | N/A |
| 8 | STS-2 | Short | 100° C. | 4 atm | 4°/min | N/A | N/A |

DESIGN OF EXPERIMENTAL MATRIX

Cure was measured subjectively based upon experience with uncured plates and plates which had been cured for an excessively long time. Cure level and blister analysis were made on a group basis. The average assessment for a group was made at the time of inspection by estimating blister level and cure level for groups of three rather than for individual plates.

After a secondary cure (194° F. for 90 minutes and 275° F. for 180 more minutes) was completed, all of the pressurized plates were blistered and none of the ambient cured plates were blistered. The following results were obtained:

| Sets | Avg. gm/gm | Blister Level | Cure Level |
|---|---|---|---|
| 1 | 30.8% | 0% | 35% |
| 2 | 30.4% | 75% | 50% |
| 3 | 31.7% | 2% | 80% |
| 4 | 31.3% | 0% | 60% |
| 5 | 18.1% | 0% | 45% |
| 6 | 17.1% | 0% | 40% |
| 7 | 20.3% | 0% | 35% |
| 8 | 18.8% | 0% | 25% |

The impregnated plates which were studied herein were not fully filled. The average pick-up in terms of initial percent weight gain was below what would be expected for a 75% voids-filled plate.

Blistering was not strongly evident for plates cured in the primary study, suggesting that the ramp rate of temperature, and thus the heat transfer rate, was slow enough not to cause blisters. A blister is defined as an area which is larger than 1 mm in diameter and is measurably higher than the surrounding surface. Plate blistering was measured as the area of the plate which was blistered divided by the total area of the plate. Therefore, a 75% blister level indicates that ¾ of the plate's surface was damaged by blistering, each blister being at least 1 mm in diameter.

The calculation of cure effects suggest that resin type and pressure were important factors. The STS-1 thermal cure worked better than the STS-2 anaerobic cure. The inferior results which were obtained from the pressure cure are attributable to differences in heat transfer through the pressure vessel.

EXAMPLE 2

Comparison of Post-Impregnation Prior Art Cure Cycle With Post-Impregnation Dry Pressure Cure Cycle Impregnation Process A process was conducted to obtain data on a 16-hour pressure soak impregnation cycle and experiment with a post-impregnation dry vacuum cure cycle. The process used was a 35-minute dry vacuum step at 4.5 torr followed by a 5-minute wet vacuum at 9 torr. This was followed by a 16-hour pressure soak of 100 psi. The sealant used was STS-1 (thermal cure sealant) to allow stable liquid for long periods without aeration.

Test Procedures

Fourteen single-sided graphite plates were used and the mass of each sample was measured. The samples were pre-baked at 120° C. for 50 minutes and subsequently placed into pressure vessels and processed according to the impregnation process outlined above. The samples were removed from the pressure vessel, hand washed until visually clean, dried and weighed. Volume displacement tests were immediately conducted on samples 7, 8, 10, 13.

Several samples were pressure cured prior to conducting a volume displacement test. The object of the cure cycle was to try a fast ramp while adding minimal pressure. During the pressure cure cycle, the samples were placed in an oven set at 167° F. The temperature of the oven was ramped linearly from a starting temperature of 167° F. to a final temperature of 277° F. at a rate of 20° F. every 5 minutes. Concurrently, the pressure applied to the plates was linearly ramped at a rate of 5 psi every 5 minutes in correlation with the escalating temperature in the oven. The maximum pressure reached was 40 psi. The plates were maintained at the maximum temperature and pressure for 30 minutes.

The samples which were not pressure cured were cured following a post-impregnation dry vacuum in which initial oven temperature was also set at 167° F. The temperature was linearly ramped from 167° F. to 277° F. at a rate of 10° F. every 5 minutes. Once the temperature reached 277° F., the samples were held at this temperature for 30 minutes. The object of this cure cycle was to determine whether a post-impregnation dry vacuum could reduce blistering of the plates during curing. Samples 5 and 11 were placed under a dry vacuum of 8 torr for 30 minutes prior to being placed into the oven. Samples 3 and 12 were not placed under a vacuum.

Observations

The plates cured under pressure were fully cured with very minimal blistering (diameter <<1 mm). Plates cured following the post impregnation dry vacuum appeared to be identical to the control plates which were cured at the same time. These samples had considerable blistering and were fully cured. Results of the pressure cure process are shown in the table below.

| | | PRESSURIZED CURE PLATES | | | |
|---|---|---|---|---|---|
| Plate | Initial Wt. | Final Wt. | Sealant Pick-up | % of Initial Mass | Plate Volume | % Voids Filled |
| 1 | 71.879 | 120.582 | 48.703 | 67.8% | 83.076 | 95.7% |
| 2 | 70.495 | 121.348 | 50.853 | 72.1% | 83.647 | 97.6% |
| 3 | 70.481 | 120.516 | 50.035 | 71.0% | 83.203 | 96.8% |
| 4 | 68.858 | 120.413 | 51.555 | 74.9% | 84.208 | 96.5% |
| 5 | 69.168 | 120.069 | 50.901 | 73.6% | 83.172 | 97.4% |

The samples cured under pressure displaced less volume than the uncured plates. This has a direct effect on the percent voids filled, where 2 g less displacement is equivalent to approximately 3.5% more voids filled.

From the pressure cure tests, it was determined that a fast ramp (20° F. per 5 minutes) can be used with minimal pressure (5 psi per 5 minutes) being added. This ramp decreases the cure time from 2 hours to ½ hour with pressure only reaching 40 psi. Also, curing under pressure reduces the volume of the plate about 2 cm$^3$ and conversely increases the percentage of voids filled therein.

The post-impregnation dry vacuum-cured plates showed no difference to the control plates cured under identical conditions. This indicates that the post impregnation dry vacuum had no success on removing additional air from the plates.

EXAMPLE 3

Inventive Impregnation Curing Process Using Fluid Heat Transfer Medium During Cure Cycle Impregnation Process Air was evacuated from plate porosity during a 35-minute dry vacuum step reaching 2 torr, followed by a 5-minute wet vacuum reaching 6 torr. This was followed by a 19-hour pressure soak of 95 psi. The sealant used was STS-1 (thermal cure sealant) to allow stable liquid for long periods without aeration.

Test Procedure

Single-sided graphite plates were used and the mass of each sample was measured. The samples were placed into a pressure vessel and subject to the impregnation process described hereinabove. During the process, there was insufficient resin in the tank to fully cover the plates, leaving about 2 cm of the top edge exposed and subsequently blistered. Quarter sections of the plates which had no blisters were cut off and used in the cure tests. These samples were hand washed until visually clean. Sets having 4 quarter-sections each were used for each combination.

During a pressure cure cycle as described in Example 2, sets 1 and 2 were placed into a hot water bath set at 198° F., wherein set 1 was removed after 10 minutes and set 2 was removed after 20 minutes. Sets 3 and 4, were placed into a hot water bath set at 210° F., wherein set 3 was removed after 10 minutes and set 4 was removed after 20 minutes. All of the samples were dried and examined, with the following results.

| Set | Cured Temp (° F.) | Duration (minutes) | Result |
|---|---|---|---|
| 1 | 199 | 10 | Very poorly cured with ¼ of samples blistered |
| 2 | 199 | 20 | Poorly cured with ¾ of samples blistered |
| 3 | 210 | 10 | Very good cure with ¼ of samples blistered |
| 4 | 210 | 20 | Fully cured with ¼ of samples blistered |

After examining the results, 199° F. is an inadequate temperature for the heat cure the samples in a short time of 20 minutes. However, after 20 minutes at 210° F., the samples were almost fully cured with full cure occurring at 20 minutes. Even at this higher temperature, the hot water bath is not at boiling temperature. Such temperature is substantially lower than that of the liquid curing bath disclosed in the '940 Patent, described hereinbefore.

It is believed that during the pressure soak part of the cycle, air was forced into the plates. The air expanded against the walls of the plates when depressurized and caused the proliferation of blisters throughout most of the plates. It is believed that blistering that occurred during the cure was due to thermal expansion of the same air.

From the pressure cure tests, it was determined that a quick increase of temperature (i.e. 4° F. per minute) can be applied in combination with a minimal incremental pressure increase (i.e. 1 psi per minute) to improve the cure of polymerizable impregnant in a porous part prior to further treatment and/or application of the part for its intended purpose. The increase reduces the cure time significantly with pressure reaching only modest levels, as compared to convention post-impregnation curing procedures. Also, it appears that curing under pressure in the manner disclosed increases the percentage of porosity filled with the impregnant composition.

It is further observed that in conventional curing procedures, surface asperities such as blisters can occur along the edges of a part which contacts the bottom surface of the curing chamber during the curing process. Such damage to the part indicates that heat transfer through the bottom of the tank (conduction) is significantly faster than heat transfer through the air inside the tank (convection). Utilization of a heat transfer medium, such as water, in combination with the incremental addition of temperature and pressure during a pressure cure cycle, can compensate for this discrepancy, resulting in reduction of the cure time to as little as 20 minutes with minimal blistering. Although specific temperature and pressure thresholds may vary with the material composition of the parts, the type of impregnant used, the purpose of the part and other factors, the implementation of incrementally increased temperature and pressure remains applicable.

Various changes to the foregoing described and shown method and corresponding structures would now be evident to those skilled in the art. Accordingly, the particularly disclosed scope of the invention is set forth in the following claims.

What is claimed is:

1. A method of heat curing a polymerizable impregnant composition within a porous article impregnated therewith, comprising the steps of:
   a.) providing a system comprising a curing chamber having therein a heat transfer medium and said porous impregnated article;
   b.) subjecting said impregnated article to successively discrete temperature and pressure increases within said curing chamber, wherein each successive temperature and pressure increment exceeds a previous temperature and pressure increment and each successive temperature and pressure is sustained at a time interval sufficient to substantially normalize the temperature of said system and to further promote cure of said impregnant composition until a desired final temperature and desired final pressure is obtained; and
   c.) maintaining said final temperature and pressure to cure said composition.

2. The heat curing method according to claim 1 wherein said discrete temperature and pressure increments are selected to minimize structural damage of said porous article.

3. The heat curing method according to claim 2 wherein factors for selecting said discrete temperature and pressure increments are selected from the group consisting of type and amount of impregnant composition, configuration and size of said porous article, type of material used to fabricate said porous article, process of manufacturing said article, end use of said porous article and combinations thereof.

4. The heat curing method according to claim 1 wherein said successively increasing discrete temperature increments are about 2° F. to about 10° F. apart.

5. The heat curing method of claim 4 wherein said successively increased discrete temperature increment are about 4° F. to about 6° F. apart.

6. The heat curing method of claim 1 wherein said successively increased pressure increments are about 1 psi to about 10 psi apart.

7. The heat curing method according to claim 6 wherein said successively increasing discrete temperature increments are about 1 psi to about 2 psi apart.

8. The heat curing method of claim 1 wherein said impregnated article is subjected to a first temperature and a first pressure for a time interval sufficient to initiate cure of said impregnant composition.

9. The heat curing method of claim 8 wherein said impregnated article is subjected to a second temperature and second pressure in excess of said first temperature and said first pressure, respectively, for a second time interval sufficient to promote cure of said impregnant composition.

10. The heat curing method of claim 1 wherein said impregnant composition includes a curable resin selected from the class consisting of phenolic resins, vinyl resins, silicone resins, acrylic resins, epoxy resins, and (meth) acrylic resins.

11. A method of heat curing a polymerizable impregnant composition within a porous article impregnated therewith, comprising the steps of:
   a.) providing a system comprising a curing chamber having therein a heat transfer medium and said porous impregnated article;
   b.) subjecting said porous article to a first temperature and a first pressure for a time interval sufficient to initiate cure of said impregnant composition;
   c.) subjecting said impregnated article to successively discrete temperature and pressure increases within said curing chamber, wherein each successive temperature and pressure increment exceeds a previous temperature and pressure increment and each successive temperature and pressure is sustained at a time interval sufficient to substantially normalize the temperature of said system and to further promote cure of said impregnant composition until a desired final temperature and desired final pressure is obtained; and
   d.) maintaining said final temperature and pressure to cure said composition.

12. The heat curing method according to claim 11 wherein said discrete temperature and pressure increments are selected to minimize structural damage of said porous article.

13. The heat curing method according to claim 12 wherein factors for selecting said discrete temperature and pressure increments are selected from the group consisting of type and amount of impregnant composition, configuration and size of said porous article, type of material used to fabricate said porous article, process of manufacturing said article, end use of said porous article and combinations thereof.

14. The heat curing method according to claim 11 wherein said successively increasing discrete temperature increments are about 2° F. to about 10° F. apart.

15. The heat curing method of claim 14 wherein said successively increased discrete temperature increment are about 4° F. to about 6° F. apart.

16. The heat curing method of claim 11 wherein said successively increased pressure increments are about 1 psi to about 10 psi apart.

17. The heat curing method of claim 16 wherein said successively increased discrete pressure increments are about 1 psi to about 2 psi apart.

18. The heat curing method of claim 11 wherein said porous article is subjected to a second temperature and a second pressure in excess of said first temperature and said first pressure, respectively, for a second time interval sufficient to promote cure of said impregnant composition.

19. The heat curing method of claim 11 wherein said impregnant composition includes a curable resin selected from the class consisting of phenolic resins, vinyl resins, silicone resins, acrylic resins, epoxy resins, and (meth) acrylic resins.

20. A system for heat curing a polymerizable impregnant composition within a porous article impregnated therewith, comprising:
 a.) a curing chamber having therein a heat transfer medium and said porous article impregnated with said impregnant composition;
 b.) means for controlling pressure and temperature in discrete successive increments wherein each successive temperature and pressure increment exceeds a previous temperature and pressure increment, respectively, and each successive temperature and pressure is sustained at a time interval sufficient to substantially normalize the temperature of said system and to further promote cure of said impregnant composition until a desired final temperature and desired final pressure is obtained; and
  means for verifying said discrete temperature and pressure increments so as to enable maintenance of said final temperature and pressure to cure said impregnant composition.

21. The heat curing system of claim 20 wherein said discrete temperature and pressure increments are selected to minimize structural damage of said porous article.

22. The heat curing system of claim 21 wherein factors for selecting said discrete temperature and pressure increments are selected from the group consisting of type and amount of impregnant composition, configuration and size of said porous article, type of material used to fabricate said porous article, process of manufacturing said article, end use of said porous article and combinations thereof.

23. The heat curing system of claim 20 wherein successively increasing discrete temperature increments are about 2° F. to about 10° F. apart.

24. The heat curing system of claim 23 wherein successively increased discrete temperature increment are about 4° F. to about 6° F. apart.

25. The heat curing system of claim 20 wherein successively increased pressure increments are about 1 psi to about 10 psi apart.

26. The heat curing system of claim 25 wherein said successively increased pressure increments are about 1 to about 2 psi apart.

27. The heat curing system of claim 20 wherein said impregnated article is subjected to a first temperature and a first pressure for a time interval sufficient to initiate cure of said impregnant composition.

28. The heat curing system of claim 27 wherein said impregnated article is subjected to a second temperature and second pressure in excess of said first temperature and first pressure, respectively, for a second time interval sufficient to promote cure of said impregnant composition.

29. The heat curing system of claim 20 wherein said temperature controlling means includes a convection oven with analog temperature control.

30. The heat curing system of claim 20 wherein said temperature controlling means includes a convection oven with electronic temperature control.

31. The heat curing system of claim 20 wherein said temperature verifying means includes a calibrated thermometer.

32. The heat curing system of claim 20 wherein said pressure verifying means includes a calibrated pressure gauge.

33. The heat curing method of claim 20 wherein said impregnant composition includes a curable resin selected from the class consisting of phenolic resins, vinyl resins, silicone resins, acrylic resins, epoxy resins, and (meth) acrylic resins.

34. A porous article having its porosity filled with a polymerizable composition and having improved structural integrity and surface quality, said product formed by the steps of:
 a.) providing a system comprising a curing chamber having therein a heat transfer medium and said porous impregnated article;
 b.) subjecting said impregnated article to successively discrete temperature and pressure increases within said curing chamber, wherein each successive temperature and pressure increment exceeds a previous temperature and pressure increment and each successive temperature and pressure is sustained at a time interval sufficient to substantially normalize the temperature of said system and to further promote cure of said impregnant composition until a desired final temperature and desired final pressure is obtained; and
 c.) maintaining said final temperature and pressure to cure said composition.

35. The heat curing method according to claim 34 wherein said discrete temperature and pressure increments are selected to minimize structural damage of said porous article.

36. The heat curing method according to claim 35 wherein factors for selecting said discrete temperature and pressure increments are selected from the group consisting of type and amount of impregnant composition, configuration and size of said porous article, type of material used to fabricate said porous article, process of manufacturing said article, end use of said porous article and combinations thereof.

37. The heat curing method according to claim 34 wherein said successively increasing discrete temperature increments are about 2° F. to about 10° F. apart.

38. The heat curing method of claim 37 wherein said successively increased discrete temperature increment are about 4° F. to about 6° F. apart.

39. The heat curing method of claim 34 wherein said successively increased pressure increments are about 1 psi to about 10 psi apart.

40. The heat curing method according to claim 39 wherein said successively increasing discrete temperature increments are about 1 psi to about 2 psi apart.

41. The heat curing method of claim 34 wherein said impregnated article is subjected to a first temperature and a first pressure for a time interval sufficient to initiate cure of said impregnant composition.

42. The heat curing method of claim 41 wherein said impregnated article is subjected to a second temperature and second pressure in excess of said first temperature and first pressure, respectively, for a second time interval sufficient to promote cure of said impregnant composition.

43. The heat curing method of claim 34 wherein said impregnant composition includes a curable resin selected from the class consisting of phenolic resins, vinyl resins, silicone resins, acrylic resins, epoxy resins, and (meth) acrylic resins.

44. A method of producing an improved impregnated porous article comprising the steps of:
  a.) selecting a porus article for impregnation;
  b.) impregnating said porous article with a polymerizable impregnant composition;
  c.) providing a system comprising said porous article and a curing chamber having a heat transfer medium therein;
  d.) placing said impregnated article in said curing chamber;
  e.) heat curing said impregnant composition by subjecting said impregnated article to successively discrete temperature and pressure increases within said curing chamber wherein each successive temperature and pressure increment exceeds a previous temperature and pressure increment, respectively, and each successive temperature and pressure is sustained at a time interval sufficient to substantially normalize the temperature of said system and promote cure of said impregnant composition until a desired final temperature and final pressure are obtained thereby; and
  f.) maintaining said final temperature and pressure to cure said impregnant composition.

45. The heat curing method according to claim 44 wherein said discrete temperature and pressure increments are selected to minimize structural damage of said porous article.

46. The heat curing method according to claim 45 wherein factors for selecting said discrete temperature and pressure increments are selected from the group consisting of type and amount of impregnant composition, configuration and size of said porous article, type of material used to fabricate said porous article, process of manufacturing said article, end use of said porous article and combinations thereof.

47. The heat curing method according to claim 44 wherein said successively increasing discrete temperature increments are about 2° F. to about 10° F. apart.

48. The heat curing method of claim 47 wherein said successively increased discrete temperature increment are about 4° F. to about 6° F. apart.

49. The heat curing method of claim 48 wherein said successively increased pressure increments are about 1 psi to about 10 psi apart.

50. The heat curing method according to claim 49 wherein said successively increasing discrete temperature increments are about 1 psi to about 2 psi apart.

51. The heat curing method of claim 44 wherein said impregnated article is subjected to a first temperature and a first pressure for a time interval sufficient to initiate cure of said impregnant composition.

52. The heat curing method of claim 51 wherein said impregnated article is subjected to a second temperature and second pressure in excess of said first temperature and said first pressure, respectively, for a second time interval sufficient to promote cure of said impregnant composition.

53. The heat curing method of claim 44 wherein said impregnant composition includes a curable resin selected from the class consisting of phenolic resins, vinyl resins, silicone resins, acrylic resins, epoxy resins, and (meth) acrylic resins.

* * * * *